Patented Mar. 17, 1942

2,276,975

UNITED STATES PATENT OFFICE 2,276,975

VULCANIZATION ACCELERATOR

Louis H. Howland, Nutley, N. J., assignor, by mesne assignments, to United States Rubber Company, New York, N. Y., a corporation of New Jersey No Drawing. Application June 9, 1938, Serial No. 212,699

5 Claims. (Cl. 260—784)

This invention relates to improvements in manufacture of vulcanized rubber goods, and more particularly to a new class of vulcanization accelerators.

According to the invention a vulcanizable rubber stock is vulcanized in the presence of a heterocyclic compound having a nucleus of the formula (A) 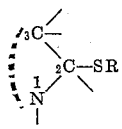

where R is hydrogen or a substitute radical; N is nitrogen; and the dotted line represents a chain of at least 3 and not more than 4 neighboring ring carbon atoms none of said ring carbon atoms being carbon atoms of an aromatic ring.

The nitrogen atom is preferably doubly bonded to the 2-carbon atom, as in (B) 

Mercaptans of such structure B are tautomeric and may exist in equilibrium in either the keto or enol form, but are preferably designated as having the enol form.

Accelerators having such a monocyclic parent nucleus may be used in the form of the free mercaptans, or of various derivatives thereof, including the mono and polysulphides, metallic salts, ammonia or amine salts, thioethers hydrolyzing or decomposing to an accelerating body at vulcanization temperatures, acidyl derivatives, aldehyde derivatives, particularly formaldehyde derivatives, ketone derivatives, particularly acetone derivatives. They may also be used in the presence or absence of adjuvants such as ammonia compounds, amines, amine salts, and organic bases in general, including urea and the diaryl guanidines and their acyl derivatives and salts. They may further be used in conjunction with other accelerators among which are the aldehyde amine, guanidine, guanidine salt, dithiocarbamate xanthate, mercaptobenzothiazole, etc. types of accelerators. The materials may be used either in their pure or less pure forms.

Exemplary of the preferred compounds falling within the scope of the invention are:

2-mercapto pyridine; 2,4-dimercapto pyridine; 2,6-dimercapto pyridine; 2,5-dimercapto pyridine; 2,4,6-trimercapto pyridine; 2-mercapto-6-methyl pyridine; corresponding mercapto bodies with saturated and partially saturated pyridine rings; 2-thion hexamethylene imines, etc.

To illustrate the behavior of the new class of accelerators, the following examples are given, the parts being by weight:

EXAMPLE 1

A rubber mix containing 100 parts of pale crepe rubber, 10 parts of zinc oxide, 2 parts stearic acid, 3 parts sulfur, and 0.19 part of 2-mercapto pyridine—was vulcanized 15, 30, and 60 minutes at 30 lbs. sq. in. steam pressure. The tensiles T and percent elongation E at break, compared to those of a similar stock without the accelerator, are given below.

| Cure in min. | Control | | Stock plus accelerator | |
|---|---|---|---|---|
| | T | E | T | E |
| 15 | | | 2,519 | 870 |
| 30 | | | 3,163 | 780 |
| 60 | 607 | 950 | 3,862 | 740 |

EXAMPLE 2

2-thion hexamethylene imine which is pictured below

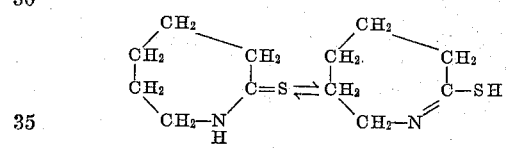

is prepared as follows:

20 gms. of 2-keto hexamethylene imine is pulverized with 32 grams of $P_2S_5$. This pulverized material is placed in a round bottom flask with 300 cc. xylene and the reaction mixture heated on the steam bath for 4 hours (approx. 90° C.). The reaction mixture is filtered hot and the xylene solution concentrated on the steam bath. On cooling, crystals separated. These are removed by filtration and then washed with petroleum ether and dried. The yield is 7.5 grams of the material melting at 103° C. 8.5 grams of additional compound is obtained by working up the residue from the xylene filtration. This residue is heated with water to break up to $P_2S_5$ and then made alkaline with NAOH. The solution is filtered, acidified with acetic acid, and concentrated to crystallization by evaporation on the steam bath.

The total yield is 68% of theory based on the keto body.

A rubber mix like the one in Example 1 but containing .5 part of 2-thion hexamethylene imine in place of the 2-mercapto pyridine, was cured 30, and 60 minutes at 30# steam pressure. The tensiles and percent elongation at break are, 3429 T and 770 E for the 30 min. cure, and 3247 T and 800 E for the 60 min. cure.

EXAMPLE 3.—*2-pyridyl disulphide*

15 grams of 2-mercapto pyridine is dissolved in 500 cc. of warm water and water insoluble impurities are removed by filtration. 40 cc. of hydrogen peroxide (30%) is added to filtrate while agitating. An oily layer appears on the bottom of the reaction vessel. The reaction mixture is allowed to stand overnight and then is cooled in an ice bath. The oily layer solidifies and the aqueous solution is removed by decantation. The solidified material is recrystallized from petroleum ether. The melting point of the 2-pyridyl disulfide is 57–58° C. and the yield is 5 grams of recrystallized material.

A rubber mix containing by weight 100 parts of rubber, 10 parts zinc oxide, 2 parts of stearic acid, 3 parts of sulfur, and 0.32 parts of 2-pyridyl disulfide was cured 30′ and 60′ at 30# steam pressure. The tensile T and elongation at break E data are, 3755 T and 730 E for the 30 min. cure, and 4169 T and 650 E for the 60 min. cure.

EXAMPLE 4.—*Zinc salt of 2-mercapto pyridine*

11.1 grams (0.1 mole) of 2-mercapto pyridine and 5.6 grams (0.1 mole) of potassium hydroxide are dissolved in 75 cc. of water in order to obtain the potassium salt of 2-mercapto pyridine. This solution is poured slowly with agitation into a solution composed of 20 grams of $Zn(NO_3)_2.6H_2O$ and 200 cc. of water. A white precipitate forms. This precipitate of the zinc salt of 2-mercapto pyridine is removed by filtration and thoroughly washed with hot water to remove any unreacted zinc nitrate or potassium salts. The yield of dried material is 14 grams or 97.9% of the theoretical yield.

A rubber mix containing by weight 100 parts of rubber, 10 parts of zinc oxide, 2 parts of stearic acid, 3 parts of sulfur, and 0.32 parts of the zinc salt of 2-mercapto pyridine was cured 30′ and 60′ at 30# steam pressure. The tensile T and elongation at break E data are, 3309 T and 810 E for the 30 min. cure, and 3528 T and 740 E for the 60 min. cure.

The new accelerators may be added to the rubber by mill incorporation, by impregnation, by addition to latex or other dispersions thereof, or the rubber may be vulcanized in aqueous or organic solutions of the accelerator. The accelerators may be used in a variety of rubber mixes, and the stocks subjected either to mold cures, air cures, ammonia cures, submarine cures, steam cures, etc.

Various compounding ingredients such as fillers, pigments, softeners, anti-oxidants, anti-scorchers, or vulcanization retarders may be employed in practicing the invention. The accelerators may be used in the vulcanization of whole latex rubber or rubber recovered from latex by coagulation or separated from latex by mechanical or centrifugal creaming or chemical creaming methods as will be apparent to those skilled in the art.

The invention may be applied in the vulcanization of various vulcanizable rubbers, natural and artificially-prepared, as well as reclaims and latices of such rubbers. The methods of using the various accelerating agents herein set forth, as to the quantity employed, time of vulcanization, the heat required, and the proportions of metal oxide, sulphur and other ingredients may be varied without departing from the principle of the invention, as hereafter claimed.

Having thus described my invention, what I claim and desire to protect by Letters Patent is:

1. A process of producing vulcanized rubber products which comprises incorporating in rubber prior to vulcanization thereof, 2-mercapto pyridine.

2. A process of producing vulcanized rubber products which comprises incorporating in rubber prior to vulcanization thereof, a 2-thion hexamethylene imine compound.

3. A process of producing vulcanized rubber products which comprises incorporating in rubber prior to vulcanization thereof, a pyridyl 2-sulphide in which all the carbon atoms of the pyridyl nucleus are members of but one ring system.

4. A process of producing vulcanized rubber products which comprises incorporating in rubber prior to vulcanization thereof, a compound having a parent nucleus composed of one nitrogen atom joined to itself by a series of at least five and not more than six ring carbon atoms, all of the said carbon atoms being members of but one ring system, and having a ring carbon atom adjacent the nitrogen joined to a non-nuclear sulphur atom.

5. A process of producing vulcanized rubber products which comprises incorporating in rubber prior to vulcanization thereof, 2-pyridyl disulphide.

LOUIS H. HOWLAND.